Feb. 25, 1964  J. H. HANDWERK ETAL  3,122,509
COHERENT NUCLEAR REACTOR ELEMENTS
Filed May 17, 1961
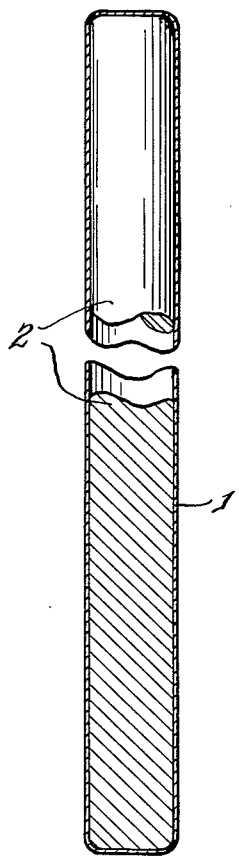
INVENTORS
Joseph H. Handwerk
Eugene D. Lynch
BY
Attorneys United States Patent Office 3,122,509
Patented Feb. 25, 1964

3,122,509
COHERENT NUCLEAR REACTOR ELEMENTS
Joseph H. Handwerk and Eugene D. Lynch, Joliet, Ill., assignors to the United States of America as represented by the United States Atomic Energy Commission
Filed May 17, 1961, Ser. No. 110,831
5 Claims. (Cl. 252—301.1)

The invention relates to novel coherent nuclear reactor elements, and to methods of making the same.

Ceramic nuclear reactor elecents such as fuel elements, blanket elements, and control elements have many advantages over elements of the metallic type. Fuel rods of uranium dioxide, for example, will withstand from about eight to ten times as much burnup on the average as metallic uranium rods, and their tendency to distort and "grow" under irradiation is far less than that of metallic rods. Ceramic elements, however, have certain drawbacks; compared to metal elements they are brittle, mechanically weak, and their thermal conductivity is poorer. The last mentioned disadvantage is aggravated by the fact that, in addition to their unsatisfactory thermal conductivity within themselves, ceramic elements do not adhere to the metal cladding that is usually put around them in order to protect them, and a gap results that contributes a further undesirable heat insulating effect.

Attempts have been made to overcome the defects just mentioned, but none have been completely satisfactory. In order to make reactor elements coherent, compaction of the ceramic particles by heat and pressure has been carried out, but this requires temperatures in the neighborhood of 1300° to 1700° C., which is above the melting point of most steels and therefore necessitates expensive cooling arrangements. Furthermore, this process requires that the compacted material be substantially free of $UF_4$ and other such fluorides, and also be quite accurately sized so as to make sure that the particles are both uniform and of certain critical dimensions; ordinary commercially available $UO_2$, for example, cannot be satisfactorily compacted under any conditions due to its variations of particle size and to traces of fluorides.

Another expedient has been to use metal binders, or "matrices," to bind the ceramic particles to each other and to the cladding. In order for this to be effective, however, the matrix metal has to be present in rather substantial proportions, so that the density of fissionable or other nuclear reactive material is seriously reduced and the geometry of the reactor must be adjusted accordingly. Furthermore, the matrix metals are affected by prolonged irradiation and show growth and distortion similar to, if not as severe as that shown by metallic uranium.

Organic resin binders have been suggested as another means of strengthening and improving the thermal conductivity and coherency of ceramic elements. While efforts along this line have not been abandoned altogether those made so far have failed to produce an organic binder capable of withstanding the conditions of heat and irradiation in nuclear reactors for the time of a practical reactor run.

It is, accordingly, an object of the invention to provide ceramic nuclear reactor elements having coherency and improved heat transfer characteristics capable of withstanding reactor conditions for the time of a practical reactor run.

It is a more particular object to provide such an element without a metal matrix or organic resin binder.

It is a further object to provide a method for making such reactor elements at temperatures substantially lower than 1300° C.

It is a more particular object to provide a method for making ceramic reactor elements from ordinary commercially available ceramic materials without the need to size them in advance and remove all traces of fluoride or other such impurities.

Other objects will become evident as the description of the invention proceeds.

All the foregoing objects are attained by our discovery that if glass compositions are used as binders, ceramic reactor elements not only have improved coherency and heat transfer characteristics, but also that conventional forming methods may be carried out far more easily and economically. For example, when very minor amounts of glass are added to a ceramic material such as uranium dioxide, this material may then be compacted at such comparatively low temperatures as 400° to 700° C., and, furthermore, ordinary commercially available ceramic materials may be used without the need for elaborate purification and particle sizing steps in advance. Even extrusion and vibratory compaction, both difficult methods to carry out with ceramic materials without a glass binder, may be carried out under certain circumstances with ease and success. Other illustrations of the above statement will become apparent later on.

To prevent confusion, since glass itself is a ceramic material in the strict technical sense of the term, it should be explained that in the present application the term "ceramic material" means a refractory non-metallic, inorganic, crystalline material having a melting point above 1000° C. "Nuclear ceramic material," "nuclear ceramic fuel material," "nuclear ceramic blanket material," "nuclear ceramic control material" and the like should be taken as referring only to those ceramic materials now used, or proposed to be used, in nuclear elements such as fuel elements, blanket elements, and control elements, with glass itself excluded. Glass, even if considered as ceramic, is easily distinguished from other ceramic materials in that it is not crystalline but in the nature of a supercooled liquid with no definite melting point, whereas the other ceramic materials are crystalline. Examples of nuclear ceramic materials are the oxides, carbides, nitrides, sulfides and other such compounds of uranium, plutonium, thorium and the other actinides, or actinide rare earths as they are also called, of boron, indium, gadolinium and the other lanthanides, or lanthanide rare earths as these are also called, and the like. While, of course, details will vary depending upon what particular ceramic material is being processed, the principles of our invention apply to all of them. While our experimental work has been done with nuclear elements in the shape of rods, the principles of our invention are also applicable to elements in other shapes such as plates, disks, and the like.

Reference is now made to the only figure of the drawing which shows a nuclear rod comprising an outer metal sheath, or cladding 1, which is in section, and an inner coherent ceramic and glass solid cylinder 2 of nuclear material, a portion of which has been broken out and removed near the middle. The solid cylinder 2 is any of the following intermixed with a glass composition of the invention:

(1) A fuel material such as a member of the class consisting of $UO_2$, $PuO_2$, UN, PuN, PuC, US, PuS, and UC. Such materials, of course, may be of varying degrees of "enrichment," as is known in the art.

(2) A blanket material such as a member of the class consisting of natural $UO_2$, UN, UC and US, and $ThO_2$, ThN, ThC and ThS. The uranium compounds of this class may, of course, be "depleted" in $U^{235}$, as is known in the art.

(3) A control material such as a member of the class consisting of $B_4C$, $Gd_2O_3$, and $Eu_2O_3$.

While, as a practical matter, the cladding 1 should be used in nearly all cases, the invention contemplates nuclear elements without cladding as well.

As above stated, our invention can be carried out by any of a number of conventional shaping methods, and with far greater ease than would be the case if our concept of using a glass binder were not employed. Ordinarily it is considered to be merely a matter of academic interest to say that glass is a supercooled liquid rather than a true solid, but here this distinction has great practical utility. The liquid nature of glass not only lends coherency, heals cracks and other surface discontinuities at reactor operating temperatures, but it also greatly facilitates the carrying out of many shaping methods such as pressure compaction, vibratory compaction and extrusion. Time limitations have made it impossible to try out our invention with all the numerous shaping methods known to exist, but the success we have had with those so far tried leads to the conclusion that the same will be true with many others, if not with all. An especially surprising feature of our discovery is how little glass is needed to bring about these improved results, as can be seen when the various methods are described separately as follows.

WARM PRESSURE COMPACTION

We call our method of pressure compaction "warm pressure compaction," as distinguished from conventional hot pressure compaction of nucelar ceramic materials at 1300° to 1700° C. Our method which may be carried out at 400° to 700° C., well below the softening point of most steel, and it calls for no elaborate cooling measures and may be carried out in a straightforward way with commercially available materials. Materials of varied particle sizes, with trace amounts of such impurities as fluorides, may be used, even so-called "dead burned" $UO_2$, which is very coarse irregularly sized $UO_2$ which, up to the present, has been regarded as completely unuseable for compaction.

We begin with a conventional base glass composition made of conventional glass-making materials, preferably a soft type of glass. By the term conventional glass-making materials is meant $SiO_2$, $CaO$, $Na_2O$, $K_2O$, $B_2O_3$ and other such materials commonly used in glass-making. Examples of base glasses that may be used are the following, the symbol "w/o" meaning percent by weight:

Base glass No. 1: 10 w/o $Na_2O$, 20 w/o $K_2O$, 70 w/o $SiO_2$

Base glass No. 2: 10.6 w/o $Na_2O$, 19.8 w/o $K_2O$, 69.6 w/o $SiO_2$

Base glass No. 3: 16.5 w/o $Na_2O$, 10.9 w/o $CaO$, 72.6 w/o $SiO_2$

Base glass No. 4: a trace to 4 w/o $Al_2O_3$, balance base glass No. 1

Base glass No. 5: a trace to 4 w/o $Al_2O_3$, balance base glass No. 2

Base glass No. 6: 62.1 w/o $PbO$, 10.0 w/o $Na_2O$, 27.9 w/o $SiO_2$

Base glass No. 7: 64.0 w/o $PbO$, 9.4 w/o $Na_2O$, 26.6 w/o $SiO_2$

Other base glasses of the same general character as those listed above may be used.

The base glass composition is then blended, as in a ball or pebble mill with a nuclear ceramic oxide additive. For fuel and blanket elements this additive is an oxide of one of the actinides or actinide rare earths. When a fuel element is being fabricated actinide fuel material in oxide form is used such as a member of the class consisting of $U_3O_8$, $UO_2$, $Pu_3O_8$ and $PuO_2$. These are blended in varying proportions from about 10 to about 90 w/o, and then melted in conventional fashion and cooled to make what we call a binder glass. In the case of a blanket element, a member of the class of oxides consisting of $U_3O_8$, $UO_2$ and $ThO_2$ may be used. These binder glasses will vary in color and other characteristics according to the amount of actinide ceramic additive that has been added; binder glasses having up to about 40 w/o of additive present a true glass appearance, perfectly transparent and only of deepening color as the additive percentage is increased. Above 40 w/o transparency begins to disappear and the binder glasses of from 40 w/o to about 60 or 70 w/o of additive present a kind of pearlescent appearance; in the glass art materials of this kind are sometimes referred to as "glassies." Above the last named percentages the binder materials take on a kind of opaque sparkling appearance, due to crystal formation by the additive, but in spite of this we have found them still to be useable as binder glasses to a surprising extent as will now be explained.

The binder glass, derived, in turn, from the base glass, may now be broken to cullet size, and then ground fine enough to pass through screens ranging from 200 mesh to 325 mesh and mixed with a second additive in the form of actinide ceramic fuel or blanket material in any proportions up to about 90 w/o of the second additive. When this second actinide additive is a nuclear fuel material, it may be any such material as, for example, a member selected from the class consisting of $UO_2$, $PuO_2$, $UN$, $PuN$, $UC$, $PuC$, $US$ and $PuS$. When this second additive is a blanket material, it may be any such material as a member of the class consisting of $UO_2$, $UN$, $US$, $UC$, $ThO_2$, $ThN$, $ThS$, $ThC$, $ThC.ThH_2$ and $ThC.ThH_2$.

As stated above, the binder glass may be as low in base glass as 10 w/o, and when the second additive is added the base glass content may then be reduced by a second factor as small as 10 w/o, so that the final composition may be as low as one weight percent in base glass. Yet, we have found, that when this is done warm compaction of the composition is still possible. The mixture should be blended as in a ball or pebble mill, preheated to about 400°–700° C. and then compacted in cylindrical or other desired shape at from about 400° to 700° C. at a pressure ranging from about 15,000 to 60,000 p.s.i.g. After about 8 to 15 minutes, depending on the size of the compacted specimen, a coherent shape results which on visual inspection has the appearance of a piece of well machined, softly polished dark-colored metal. To make a nuclear fuel, blanket, or control rod the shape may then be inserted into a closely fitting metal sheath, or cladding; at reactor operating temperatures the binder glass will soften sufficiently to cause the shape to come into close contact with the inside of the sheath, thereby eliminating a gap between the two and improving heat transfer. By our method of warm compaction we have been able to make fuel rods with $UO_2$ densities very closely approaching 100 percent of the theoretical maximum.

WARM EXTRUSION

Up until the present it has been impossible to extrude $UO_2$ at any temperature less than 1800° C., which is well above the melting point of steel; yet by adding small amounts of our binder glasses shapes may be warm-extruded at around 600° C., resulting in rods having 90 percent of the theoretical maximum density of $UO_2$. Any commercially available nuclear ceramic material may be used as in the case of pressure compaction; the only difference between the starting material in the two processes is that for warm extrusion the binder glass should not have more than 60 w/o of the first nuclear ceramic, or actinide oxide, additive, or, in other words, that the final mixture, after both additives have been added, should have at least four weight percent of the base glass left in it (40 w/o×10 w/o= 4 w/o). We prefer, however, to make this slightly higher by mixing 85 w/o of the second additive ceramic with 15 w/o of 60 w/o $U_3O_8$ binder glass; this makes the final weight percent of the base glass about 6. Such a mixture is then blended in a blending device such as a pebble mill, and after preheating to about 400° to 600° C., is brought up to an extrusion die with a taper of about 30° and extruded in a continuous shape at 400° to 600° C. A product with similar physical qualities to those produced by the warm compaction method results, and, as above stated, with a uranium content of about 90 percent of the theoretical maximum.

VIBRATORY COMPACTION

Vibratory compaction may be used with glass binders to produce fuel rods, blanket rods, and control rods, and it has been found to be especially suitable for making control rods employing such neutron absorbing material as boron carbide, $B_4C$.

Up until the present invention no satisfactory method has been found for compacting boron carbide to the degree required for nuclear reactor use; even slight differences in the density of control rods produces serious irregularities in the neutron flux. When our binder glasses are used, however, a coherent control rod of uniform density may be produced by vibratory compaction with mild heating or at room temperature followed by sintering. Likewise, fuel and blanket rods may be made in the same general way.

In fabricating control rods a base glass of conventional glass-making materials of the kind above described is blended with $B_4C$ in the proportions called for by the geometry of the reactor, such as 85 w/o $B_4C$ to 15 w/o base glass. The blended mixture is then placed in the metal cladding tube and compacted by vibration until it attains the desired density; we have found a density of 1.79 grams per cc. to be practical and therefore prefer this value. It is sufficient to gauge the density merely by observing the level to which the mixture has subsided in the cladding tube, the inside dimensions of the tube and the density of the mixture being known. The tube with the mixture inside is then placed in a furnace with an inert atmosphere and brought to a temperature of from about 850° to 1000° C. for a few minutes, sufficient to sinter the glass and the $B_4C$ together in a coherent form. Ordinarily eleven to fourteen minutes is sufficient for this.

As an alternative procedure, the tube, instead of being placed in a furnace, may be passed through an induction coil which heats it locally for around two to three minutes at 850° to 1000° C.

For fuel rods vibratory compaction may be used if the binder glass is ground in advance to fines, or a particle size less than 40 microns and the nuclear ceramic fuel material such as $UO_2$ is partly fines and the balance be coarse aggregate within the range of 150 to 250 microns in particle size. The fines of the binder glass and the nuclear ceramic material should be blended in such a way that the blended mixture shall contain as total fines, whether all or partly from the binder glass, 30 w/o of the blend, and the balance, none of which must come from the binder glass, shall be coarse aggregate within coarser range mentioned. At least 10 w/o of the blend must be binder glass. This blend may then either be compacted by vibration at 400° to 600° C., or compacted in the same way at room temperature followed by sintering at around 950° C. for a few minutes.

A similar procedure may be followed for blanket rods.

DISPERSION

Another application of the principle of our invention is to make dispersions of nuclear materials within glass, either of the base or binder type. One situation where this is advantage is in the making of control rods employing gadolinium, europium or one of the other neutron-absorbent metals of this kind which are expensive and have exceptionally high neutron absorption cross-sections. For both reasons of reactor geometry and economy it is necessary to get such materials thinly and uniformly dispersed within a control rod. This can be done by wetting some subdivided neutral ceramic material such as alumina or magnesia sand with an aqueous solution of a salt of an absorbent metal, such as a member of the class consisting of gadolinium nitrate, gadolinium chloride, europium nitrate and europium chloride. The neutral ceramic sand is then dried with the result that it has a thin film of the salt of the neutron-absorbent metal on the surfaces of its grains. The grains are then blended with conventional glass-making materials with sufficient agitation to make a uniform dispersion, melted and then formed into the desired shape and cooled. The shapes may then be clad and used as control rods, or they can be ground and made a component of an enamel, which enamel may be painted on metal and inserted into a reactor as a control element or as a "burnable poison" element. Such an enamel can be painted directly on the inside or outside of the cladding of fuel rod to act as a burnable poison.

DILUTION

We have found that gadolinium oxide, europium oxide, and similar neutron-absorbing oxides, while not considered to be glass-making materials, do have a limited compatibility with glass if used in sufficient dilution. This gives another method for making control and burnable poison elements; the neutron-absorbing oxide is simply melted with a glass made of conventional glass-making materials, formed into the desired shape and used.

Alternatively, the resulting glass containing the neutron-absorbing oxide is ground and made a component of an enamel which is applied to a piece of metal such as aluminum or zirconium and placed in a reactor, or painted on the inside or outside of a fuel element as a burnable poison. Since the reactor operating conditions are apt to cause the enamel to corrode it may be advisable to place the enamel between two strips of metal to protect it.

Example I

A binder glass was made of the following composition: 1.0 w/o $Na_2O$, 2.0 w/o $K_2O$, 7.0 w/o $SiO_2$, and 90 w/o $U_2O_3$. When cooled this glass was broken to the cullet size of −200 +325 mesh. This was blended for two hours with alcohol in a ball mill with commercial $UO_2$, the proportion being 10 w/o glass cullet and 90 w/o $UO_2$. The resulting blend was then removed from the mill, dried and formed into cylindrical pellets a quarter of an inch in diameter and half an inch in height. The pellets were preheated to 600° C. and then warm-compacted at 600° C. under a pressure of 15,000 p.s.i.g. for 10 minutes. The resulting compacts were then annealed to room temperature.

The compacts had a density of between 8 and 8½ grams per cc. and an outer diameter of ⅜ inch. On being sectioned and examined microscopically, they showed a smooth, coherent structure free from voids.

Example II

A binder glass was made of the following composition: 4.24 w/o $Na_2O$, 7.92 w/o $K_2O$, 27.84 w/o $SiO_2$ and 60.0 w/o $UO_2$. When cooled the glass was broken into the cullet size of −200 +325 mesh. This was blended in the proportions of 10 w/o cullet glass to 90 w/o commercial $UO_2$ in alcohol in a ball mill for three hours, removed from the mill and dried. This was placed in an extrusion apparatus which formed it into a two inch cylinder, preated it to 600° and then warm-extruded it in an argon atmosphere through a quarter inch water-cooled die with a 30° taper. A uniform appearing quarter inch cylinder resulted which was then annealed to room temperature. The cylinder was sectioned and microscopic examination showed a smooth, coherent structure free from voids. It had a density of 8½ grams per cc.

Example III

A base glass was made with the following composition: 10 w/o $Na_2O$, 20 w/o $K_2O$, and 70 w/o $SiO_2$. After cooling this was ground to the cullet size of −200 mesh. 15 w/o of the glass cullet was then blended in alcohol in a pebble mill with 85 w/o of $B_4C$ having the following particle size composition: 70 w/o −60 mesh and 30 w/o —200 mesh. The blend after 2 hours was removed from the mill and dried. 66 grams were placed in each of a number of No. 304 stainless steel tubes, 47 inches long and ⅜ inch in inner diameter. This loading brought the dried blend to ⅝ inch of the top of each tube. The tubes were placed in a vibrating apparatus and vibrated for about 5 minutes at which time the blend was about ⅝ inch from the top of the tubes. The tubes were then passed through an induction coil controlled by an optical pyrometer and a system of electrically communicating relays to maintain the temperature at from 900° to 950° C. The atmosphere was of argon and the tubes remained inside the coil for 2½ minutes.

The tubes were then removed without further annealing. Radiographic examination revealed a uniform distribution of $B_4C$ within the tubes without voids. One of the tubes was sectioned and examined microscopically; the rod of material inside the tube was seen to be coherent, without voids or cracks. No precipitation of carbon was seen in the stainless steel cladding.

*Example IV*

A binder glass with a composition of 4.24 w/o $Na_2$, 7.92 w/o $K_2O$, 27.84 w/o $SiO_2$, and 60.00 w/o $UO_2$ is ground to fines of a maximum particle size of 40 microns. 46 grams of these ground binder glass fines are mixed with 414 grams of $UO_2$ which consist of 70 w/o of coarse aggregate having particles of from about 150 to 250 microns, and of 30 w/o of fines of a maximum particle size of 44 microns. These are blended in alcohol in a pebble mill for 2 hours, and the resulting mixture is removed from the mill and dried. The mixture is then divided into ten equal loadings of 46 grams. 10 No. 304 stainless steel tubes, 4 inches long and with an inner diameter of .325 inch are filled from each of the loadings, some of which was in excess of the capacity of the tubes. The tubes are then placed in vibratory apparatus and vibrated for about 5 minutes during which the excess portion of the loadings are added as space became available at the top of the tubes as a result of the vibration. The vibration is discontinued when excess portions of the loadings are in all the tubes. The tubes are then placed inside an induction coil controlled by an optical pyrometer and a system of communicating relays to maintain the temperature at about 950° C. The atmosphere is of argon and the tubes remain inside the coil for 2½ minutes.

The tubes are then removed and permitted to reach room temperature without annealing.

*Example V*

A base glass with the composition of 10 w/o $Na_2O$, 20 w/o $K_2O$, and 70 w/o $SiO_2$ is ground to —200 mesh. This is then mixed with 5 w/o $Gd_2O_3$ of the same size and blended in a pebble mill in alcohol for 2 hours.

The mixture is withdrawn from the mill, dried, and melted at 1300° C. for 2 hours.

The resulting control element glass melt is then cast into cylinders ¾ inch long with a diameter of ½ inch. The cylinders are then inserted within closely fitting aluminum sheaths and inserted into a nuclear reactor as control rods.

*Example VI*

The control element glass produced by the method of Example V is ground in alcohol in a ball mill to powder average particle size of 44 microns. The resulting powder is withdrawn from the mill and mixed with 4 w/o clay and water to form a slurry. The slurry was applied to a metal sheet, dried, and fired at 900° C. for 3 minutes.

The resulting metal sheet coated with $Gd_2O_3$-containing enamel is inserted inside a fuel rod sheath as a burnable poison.

*Example VII*

A $Gd_2O_3$-containing enamel made in a similar manner to that set forth in Example VI and containing 10 w/o $Gd_2O_3$ is brush coated on a strip of zircaloy and a second strip of zircaloy is welded along the edges to the first strip in intimate contact with the enamel. The resulting sandwich is then heated in a furnace to 900° C. whereby the enamel softens sufficiently to adhere to both strips of zircaloy. The sandwich is then inserted in a nuclear reactor as a control element.

It will be understood that this invention is not to be limited to the details given herein, but that it may be modified within the scope of the appended claims.

What is claimed is:

1. A composition of matter consisting essentially of from 10 to 90 w/o of discrete particles of a binder glass, said binder glass consisting of a fused mixture of conventional glass making materials and from 10 to 90 w/o of an additive selected from the class consisting of $U_3O_8$, $UO_2$, $Pu_3O_8$, and $PuO_2$, and the remainder of the composition being selected from the class consisting of discrete particles of $UO_2$, $PuO_2$, UN, PuN, UC, PuC, US and PuS.

2. A coherent nuclear reactor fuel element consisting essentially of from 10 to 90 w/o of discrete particles of a binder glass, said binder glass consisting of a fused mixture of conventional glass making materials and from 10 to 90 w/o of an additive selected from the class consisting of $U_3O_8$, $UO_2$, $Pu_3O_8$ and $PuO_2$, and the remainder of the fuel element being selected from the class consisting of discrete particles of $UO_2$, $PuO_2$, UN, PuN, UC, PuC, US and PuS, the said fuel element being encased in a metal cladding.

3. A method of making a coherent nuclear reactor fuel element comprising subdividing a binder glass comprising no less than 1 w/o of conventional glass-making materials and an actinide oxide additive, mixing the subdivided glass with a subdivided actinide ceramic fuel material, and subjecting the resulting mixture to warm pressure compaction at from about 400° to 700° C. and from about 15,000 to 60,000 p.s.i.g.

4. The method of claim 3 wherein the actinide oxide additive is a member of the class consisting of $U_3O_8$, $UO_2$, $Pu_3O_8$ and $PuO_2$, and the actinide ceramic fuel material is a member of the class consisting of $UO_2$, $PuO_2$, UN, PuN, UC, PuC, US and PuS.

5. A method of making a coherent nuclear reactor fuel rod comprising subdividing a binder glass comprising conventional glass-making materials and up to 60 w/o of a nuclear ceramic oxide additive, mixing the subdivided glass with a subdivided actinide ceramic fuel material, and subjecting the mixture to warm extrusion at 400° to 600° C.

References Cited in the file of this patent

UNITED STATES PATENTS

| | | |
|---|---|---|
| 2,816,042 | Hamilton | Dec. 10, 1957 |
| 3,042,594 | Hauth | July 3, 1962 |

FOREIGN PATENTS

| | | |
|---|---|---|
| 222,587 | Australia | Nov. 6, 1958 |

OTHER REFERENCES

AEC Document KAPL 1475, February 1956.
AEC Document KAPL 1866, September 1957.
Reactor Core Materials, vol. 1, No. 2, May 1958, page 15 relied on.
2nd Geneva Conference on Atomic Energy, vol. 7, pages 544–547, September 1958.
AEC Document ORO 244, October 1959, page ii.

UNITED STATES PATENT OFFICE
CERTIFICATE OF CORRECTION

Patent No. 3,122,509            February 25, 1964

Joseph H. Handwerk et al.

It is hereby certified that error appears in the above numbered patent requiring correction and that the said Letters Patent should read as corrected below.

Column 1, line 11, for "elecents" read -- elements --; column 3, line 28, for "nucelar" read -- nuclear --; line 69, after "$U_3O_8$" insert a comma; column 5, line 65, for "advantage" read -- advantageous --; column 6, line 61, for "preated" read -- preheated --; column 7, line 23, for "$Na_2$" read -- $Na_2O$ --; column 8, line 49, after "comprising", second occurrence, insert -- no less than 1 w/o of --.

Signed and sealed this 15th day of December 1964.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,122,509            February 25, 1964

Joseph H. Handwerk et al.

It is hereby certified that error appears in the above numbered patent requiring correction and that the said Letters Patent should read as corrected below.

Column 1, line 11, for "elecents" read -- elements --; column 3, line 28, for "nucelar" read -- nuclear --; line 69, after "$U_3O_8$" insert a comma; column 5, line 65, for "advantage" read -- advantageous --; column 6, line 61, for "preated" read -- preheated --; column 7, line 23, for "$Na_2$" read -- $Na_2O$ --; column 8, line 49, after "comprising", second occurrence, insert -- no less than 1 w/o of --.

Signed and sealed this 15th day of December 1964.

SEAL)
Attest:

ERNEST W. SWIDER
Attesting Officer

EDWARD J. BRENNER
Commissioner of Patents